(12) United States Patent
Nathan et al.

(10) Patent No.: US 8,729,856 B2
(45) Date of Patent: May 20, 2014

(54) THERMAL WALL PLUG SENSING AND CONTROL

(75) Inventors: John F. Nathan, Highland Township, MI (US); David A. Hein, Sterling Heights, MI (US); Faisal K. Sallam, Dearborn, MI (US); Mark Anthony Mueller, Fenton, MI (US)

(73) Assignee: Lear Corporation, Southfield, MI (US)

( * ) Notice: Subject to any disclaimer, the term of this patent is extended or adjusted under 35 U.S.C. 154(b) by 371 days.

(21) Appl. No.: 13/078,164

(22) Filed: Apr. 1, 2011

(65) Prior Publication Data

US 2012/0212179 A1 Aug. 23, 2012

Related U.S. Application Data

(60) Provisional application No. 61/445,714, filed on Feb. 23, 2011.

(51) Int. Cl.
*H02J 7/00* (2006.01)
*H01R 4/66* (2006.01)
*H01R 11/00* (2006.01)

(52) U.S. Cl.
CPC ............... *H01R 11/00* (2013.01); *Y02T 90/14* (2013.01); *Y02T 90/10* (2013.01); *Y02T 90/12* (2013.01)
USPC ............ 320/109; 439/108; 439/503; 439/504

(58) Field of Classification Search
CPC ......... Y02T 90/14; Y02T 90/10; Y02T 90/12; H01R 11/00
USPC ................... 320/109; 439/108, 503, 508, 504
See application file for complete search history.

(56) References Cited

U.S. PATENT DOCUMENTS

| | | | |
|---|---|---|---|
| 5,116,232 A * | 5/1992 | Follett | 439/107 |
| 5,346,406 A * | 9/1994 | Hoffman et al. | 439/474 |
| 5,686,812 A * | 11/1997 | Hotta | 320/134 |
| 5,816,643 A * | 10/1998 | Itou et al. | 296/97.22 |
| 6,123,569 A * | 9/2000 | Fukushima et al. | 439/456 |
| 6,351,967 B1 * | 3/2002 | Adachi et al. | 62/441 |
| 6,509,553 B2 * | 1/2003 | Golan et al. | 219/505 |
| 6,692,284 B1 * | 2/2004 | Koh | 439/346 |
| 6,744,612 B2 * | 6/2004 | Chen | 361/58 |
| 6,993,417 B2 | 1/2006 | Osann, Jr. | |

(Continued)

FOREIGN PATENT DOCUMENTS

| | | | | |
|---|---|---|---|---|
| CN | 101499670 A | | 8/2009 | |
| WO | 2010023527 A2 | | 3/2010 | |
| WO | WO 2010049775 A2 * | | 5/2010 | B60L 11/18 |

OTHER PUBLICATIONS

Chinese Office Action for corresponding Application No. 201210028803.9, mailed Jan. 6, 2014, 10 pages.

*Primary Examiner* — M'Baye Diao
(74) *Attorney, Agent, or Firm* — Brooks Kushman P.C.

(57) ABSTRACT

A system and method operable to facilitate thermal wall plug sensing and control may include an ability to control current drawn by a charging system or other load according to a temperature determined at an interface between the charging system and an energy source used to provided energy to the charging system. A temperature sensed with a temperature sensor included in a plug assembly or other housing or cord used to connect the charging system to the energy source may be used to implement the temperature regulated current control.

14 Claims, 2 Drawing Sheets

(56) References Cited

U.S. PATENT DOCUMENTS

| | | |
|---|---|---|
| 7,465,178 B2 * | 12/2008 | Byrne .......................... 439/215 |
| 7,907,062 B2 * | 3/2011 | Feliss et al. ................ 340/693.6 |
| 2002/0097546 A1 * | 7/2002 | Weinberger .................. 361/103 |
| 2003/0050737 A1 * | 3/2003 | Osann, Jr. .................... 700/276 |
| 2003/0094925 A1 | 5/2003 | Bucur |
| 2004/0136125 A1 * | 7/2004 | Nemir et al. ................... 361/42 |
| 2005/0154384 A1 * | 7/2005 | Ben-Nun ....................... 606/29 |
| 2010/0156355 A1 | 6/2010 | Bauerle et al. |
| 2010/0241298 A1 | 9/2010 | Sinke et al. |
| 2011/0095608 A1 * | 4/2011 | Jonsson et al. ................. 307/39 |
| 2011/0141635 A1 * | 6/2011 | Fabian ........................... 361/45 |
| 2011/0246105 A1 * | 10/2011 | Ley et al. ....................... 702/60 |
| 2012/0161797 A1 * | 6/2012 | Hein ............................. 324/705 |

* cited by examiner

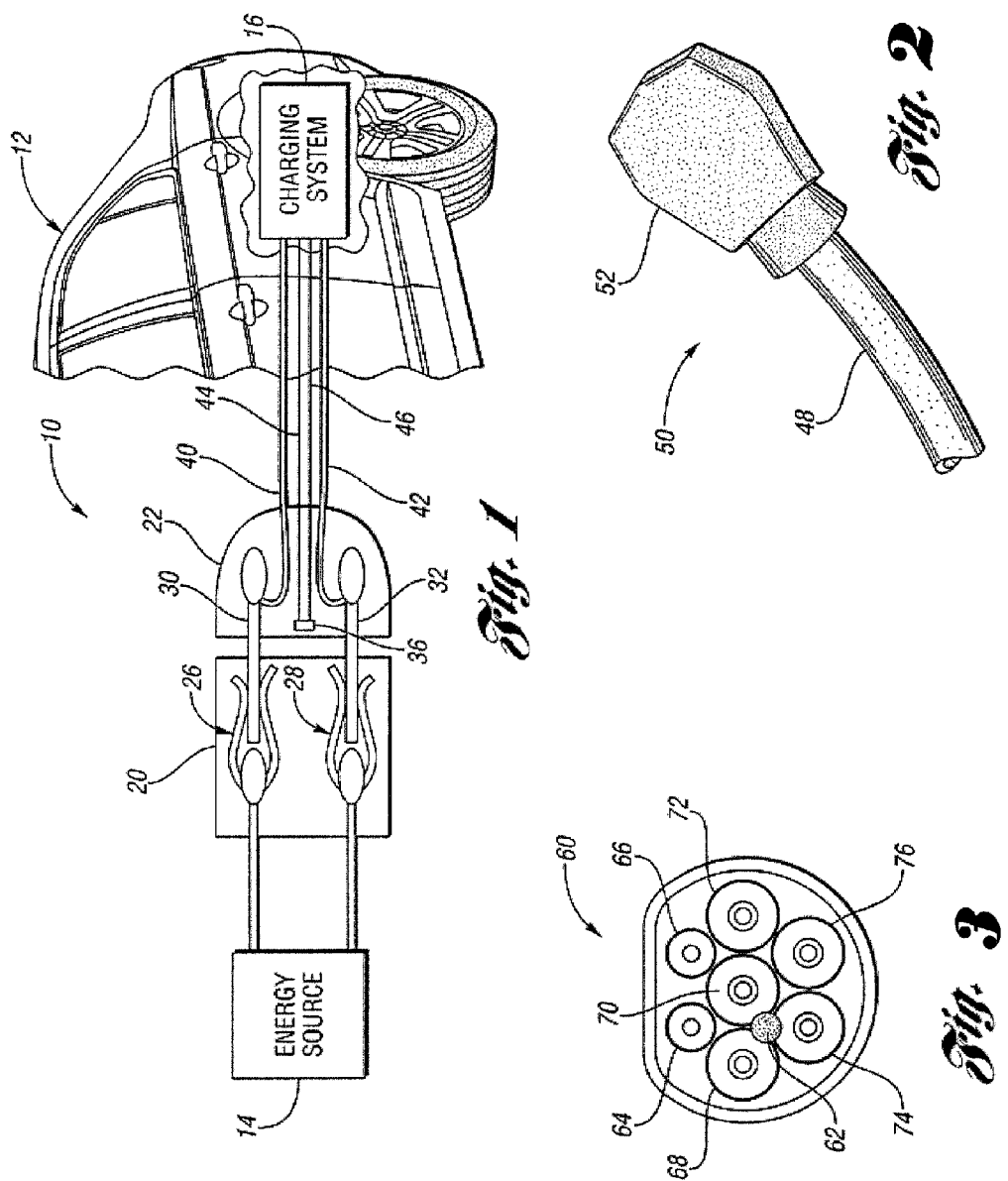

THERMAL WALL PLUG SENSING AND CONTROL

CROSS-REFERENCE TO RELATED APPLICATIONS

This application claims the benefit of U.S. provisional Application No. 61/445,714, entitled Thermal Wall Plug Sensing and Control, filed Feb. 23, 2011, the disclosure of which is incorporated in its entirety by reference herein.

TECHNICAL FIELD

The present invention relates to thermal wall plug sensing and implementing a control strategy based on temperature detected or measured at a thermal wall plug connection, such as but not limited to implementing control of a charging system used to facilitate plug-in charging of a vehicle by way of a utility wall outlet or other exterior vehicle connection.

BACKGROUND

With the advent of plug-in electric and hybrid electric vehicles, a need has arisen to build charging systems to charge vehicle systems used to facilitate electric drive related operations, such as but not limited to batteries and capacitors. The charging system may reside completely or partially within the vehicle and be operable to facilitate charging operations with energy provided through a wall outlet or other interface leading to a home/utility power grid or another type of energy source. The charging system may include a plug assembly or other interface to establish an electrical connection with the wall outlet.

SUMMARY

One non-limiting aspect of the present invention contemplates sensing temperature at a connection between a wall out and a charging system. The sensed temperature can be used to facilitate controlling charging system operations, monitoring performance or operating capabilities of the wall outlet, and for any number of other reasons.

One non-limiting aspect of the present invention contemplates a plug assembly operable for connecting a vehicle cordset used to facilitate powering a vehicle charging system to a wall outlet. The plug assembly may include: a positive connector configured to facilitate carrying current from the wall outlet to the vehicle charging system; a neutral connector configured to facilitate returning current from the vehicle charging system to the wall outlet; a ground connector configured to facilitate connecting the vehicle charging system to earth ground; and a temperature sensor operable to detect a temperature at the wall outlet.

One non-limiting aspect of the present invention contemplates a resistance of the temperature sensor approximates the temperature at the wall outlet.

One non-limiting aspect of the present invention contemplates the temperature sensor is one of a negative temperature coefficient (NTC) device, a positive temperature coefficient (PTC) device, and a thermistor.

One non-limiting aspect of the present invention contemplates a housing shaped to enclose the temperature sensor and to support the positive, neutral, and ground connectors such that at least a portion of each of the positive, neutral, and ground connectors extend exterior to the housing to be inserted within corresponding receptacles of the wall outlet.

One non-limiting aspect of the present invention contemplates the housing is injection molded over the temperature sensor, positive connector, neutral connector, and ground connector and comprised of non-conducting, at least semi-rigid material.

One non-limiting aspect of the present invention contemplates a positive wire, a neutral wire, a ground wire, and a temperature wire respectively being connected to the positive connector, the neutral connection, the ground connector, and the temperature sensor, each wire separately extending exterior to the housing within an insulated enclosure for receipt within a receptacle of the vehicle charging system.

One non-limiting aspect of the present invention contemplates a voltage of the temperature wire is measured by the vehicle charging system to determine the temperature.

One non-limiting aspect of the present invention contemplates the vehicle charging system is operable to control current flow through the positive connector as a function of the temperature.

One non-limiting aspect of the present invention contemplates the current flow is controlled according to a schedule where an amount of current flow is decreased in proportion to an increase in the temperature.

One non-limiting aspect of the present invention contemplates the amount of current flow is set by the vehicle charging system to a first level and the schedule specifies: decreasing current flow from the first level to a second level in the event the increase in temperature is greater than a first amount and less than a second amount; and decreasing current flow from the first level to a third level in the event the increase in temperature is greater than the second amount, the third level being less than the second level.

One non-limiting aspect of the present invention contemplates the schedule specifying ceasing current flow in the event the increase in temperature is greater than a third amount.

One non-limiting aspect of the present invention contemplates a rate at which the amount of current flow is decreased is proportional to a rate at which the temperature increases such that the amount of current flow is decreased more quickly as the rate of temperature increases more quickly.

One non-limiting aspect of the present invention contemplates a method of facilitate control of a vehicle charging system based on a temperature at an connection exterior to the vehicle used to deliver current to the vehicle charging system. The method may include: determining an first temperature at the connection prior to providing current to the vehicle charging system; determining a first amount of current required of the vehicle charging system to support a charging operation; determining a second temperature at the connection while the first amount of current is being delivered through the connection to the vehicle charging system; and determining whether to allow continued delivery of current through the connection to the vehicle charging system at the first amount in the event a temperature delta between the first and second temperatures is less than a predefined value.

One non-limiting aspect of the present invention contemplates a controller of the vehicle charging system determining whether to allow continued delivery of current through the connection to the vehicle charging system at the first amount, the controller decreasing current delivered through the connection from the first amount to at least a second amount in the event the temperature delta exceeds the predefined value.

One non-limiting aspect of the present invention contemplates determining the temperature delta to be equal to the second temperature minus the first temperature.

One non-limiting aspect of the present invention contemplates determining the temperature delta to be equal to a rate change from the first temperature to the second temperature.

One non-limiting aspect of the present invention contemplates determining the predefined value to be a first value based on one of the first temperature being less than a first threshold, a current geographical region, and a time of day and to be a second value based on one of the first temperature exceeding the first threshold, the current geographical region, and the time of day, the second value being less than the first value.

One non-limiting aspect of the present invention contemplates a charging system including: a controller operable to control a charging system used to electrically charge an storage element; a temperature sensor operable to determine a temperature proximate an interface between the charging system and an energy source, the charging system using energy sourced from the energy source to charge the storage element; and wherein the controller adjusts current drawn by the charging system through the interface based on the temperature.

One non-limiting aspect of the present invention contemplates the controller decreases current being drawn by the charging system in the event a temperature delta of the temperature as measured over time is greater than a predefined value.

One non-limiting aspect of the present invention contemplates the temperature sensor is one of a negative temperature coefficient (NTC) device, a positive temperature coefficient (PTC) device, and a thermistor enclosed within a plug assembly of the charging system.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a charging system in accordance with one non-limiting aspect of the present invention.

FIG. 2 illustrates a cordset and plug assembly housing in accordance with one non-limiting aspect of the present invention.

FIG. 3 illustrates a multi-port plug assembly having a temperature sensor in accordance with one non-limiting aspect of the present invention.

DETAILED DESCRIPTION

Figure 4:
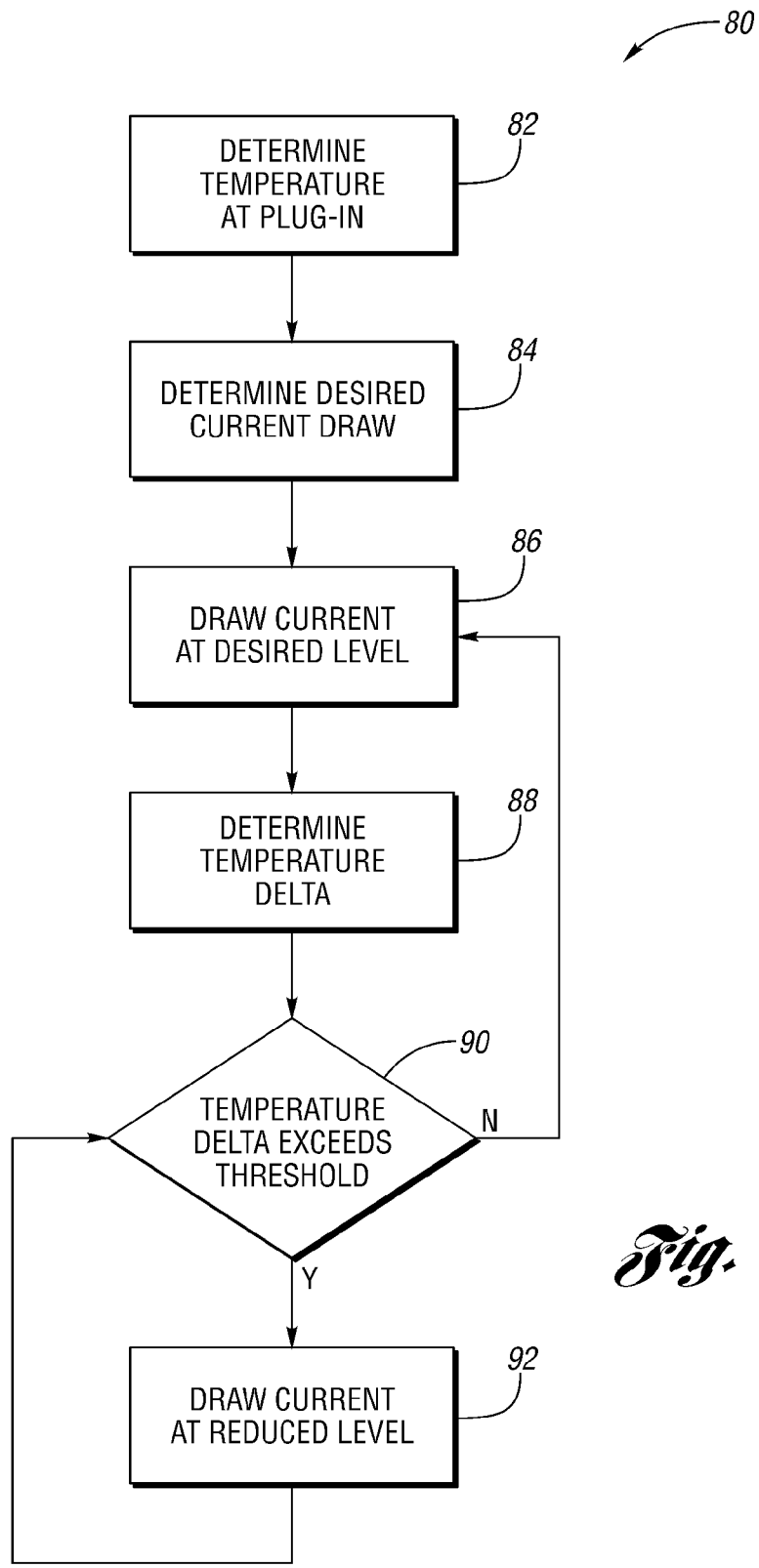
FIG. 4 illustrates a flowchart of a method for controlling a charging system in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a charging system 10 contemplated by one non-limiting aspect of the present invention where a vehicle 12 is connected to an energy source 14 to facilitate operation of a charging system 16 with energy provided from the energy source 14 by way of a wall outlet 20 and plug assembly 22. The present invention is predominately described for exemplary and non-limiting purposes with respect to facilitating delivery of AC energy to the charging system 16 for use in DC and/or AC charging/powering of a vehicle subsystem (not shown), such as a battery, capacitor, etc. The present invention, however, contemplates it use and application in any number of vehicle and non-vehicle environments where it may be desirable to monitor conditions a connection between the wall outlet 20 and plug assembly 22 or corresponding connection point of such another application.

The wall outlet 20 is shown to a two-pronged type having positive and neutral female sockets 26, 28 formed by opposing resilient elements bias inwardly to press against corresponding positive and neutral male connectors 30, 32 of the plug assembly 22. This type of resilient element connection relies on a normal force of the resilient elements to support current flow. The amount of current flow that can be supported there through is proportional to the normal force, causing the connection area to generate more heat for the same amount of current flow in the event the normal force between the connection elements is lessened. The resilient elements 26, 28, or other deformable or fatigable material type element, may lose some of its current carrying capability in this manner due to material break down and/or an inability to maintain an optimal amount of normal force at the connection with the connectors 30, 32. Even in the absence of such a breakdown, performance can be lessened in the event the male and/or female connectors 30, 32 are improperly sized for the desired mating design.

The wall outlet 20 may be connected to a utility power grid or other power source, e.g., in the event the wall outlet 20 is part of a charging station, the wall outlet 20 may be used to facilitate passing energy from the charging station to the vehicle charging system 16. The plug assembly 22 further includes a temperature sensor 36 operable to assess a temperature proximate a connection between the male and female connectors 30, 32. The temperature sensor 36 may be thermistor, positive temperature coefficient (PTC) device, negative coefficient (NTC) device, or other element suitable to measure temperature, such as but not limited to an infrared sensor of the type disclosed in U.S. Provisional Patent Application No. 61/441,404, EV Cordset Temperature Measurement, the disclosure of which is hereby incorporated in its entirety herein.

A positive wire 40 and neutral wire 42 may respectively connect to the positive and neutral male connectors 30, 32 to established current flow with the vehicle charging system 16. The positive connection 30, for example, may be used to source current to the charging system 16 and the neutral connection 32 may be used to return current to the energy source 14. Sensor wires 44, 46 may extend from the temperature sensor 36 to the charging system 16 to facilitate reporting sensed temperature values, such as by creating a circuit loop. In the event the temperature sensor 36 is a resistive element having a resistance that changes with temperature, the sensors wires 44, 46 may be used to facilitate measuring a voltage drop across the temperatures sensor 36. The charging system 16 may include a processor or other logically operating element to determine a temperature value based upon the corresponding voltage measurement.

The wires 40, 42, 44, 46 may be enclosed within an insulated material 48 of a cordset 50, such as the cordset shown in FIG. 2. The temperature sensor 36 and part of the positive and neutral connectors not extending exteriorly may be injection molded within a housing 52. The system 10 has been described with respect to one exemplary configuration where the wall outlet 20 only includes positive and neutral sockets 26, 28. The present invention, however, is not intended to be so limited and fully contemplates its use with other wall outlets 20 having more or less sockets, including three-pronged outlets having a female ground socket, five pronged outlets conforming to European three-phase operation, etc. The plug assembly 22 being adapted for use with these other configurations, such as by including a ground connector and ground wire similar in configuration to the positive and neutral connectors 30, 32 and wires 40, 42 described above.

FIG. 3 illustrates one exemplary a multi-port plug assembly 60 having a temperature sensor 62 in accordance with one non-limiting aspect of the present invention. The plug assembly 60 includes seven ports, including a plug present port 64, a control pilot port 66, and five optionally enabled ports to support Europe AC (e.g., three hot lines for three-phase AC 68, 70, 72, one neutral line 74, and one earth ground line 76.). The ports 64, 66, 68, 70, 72, 74, 76 may operate in accordance with SAE specification J1772. U.S. Pat. No. 7,878,866, entitled Connector Assembly for Vehicle Charging, the disclosure of which is hereby incorporated in its entirety herein, discloses a similar multi-port arrangement having five ports that may be modified in accordance with the present invention to include the thermistor. The temperature sensor 62 shown in FIG. 3 may be similarly configured to the temperature sensor 36 described above and injection molded into a housing or otherwise positioned proximate a connection area between the plug assembly 22 and wall outlet 20.

FIG. 4 illustrates a flowchart 80 of a method for controlling the charging system 16 in accordance with one non-limiting aspect of the present invention. The method may be embodied in a computer-readable medium or other source operable with a processor, controller, or other logically executing unit having capabilities to issue instructions or otherwise facilitate implementing the operations and other functions required to control the charging system 16 as contemplated by the present invention.

Block 82 relates to determining a temperature at or before plugging the plug assembly into the wall outlet. The temperature may be a temperature sensed with the temperature sensor 36 or from another sensor, such as a vehicle ambient air temperature sensor. One object of this pre-charging temperature reading is to identify an initial set of operating conditions of the charging system, wall outlet, charging station, etc. that then can be used to manage operation of the charging system. This initial reading is described with respect to occurring prior to the charging system 16 drawing an amount of current sufficient to perform a charging operation. This, however, is done without intending to unnecessarily limit the scope and contemplation of the present invention since a similar benchmark or reference point can be taken during a normal charging operation.

Block 84 relates to determining a desired amount of current to be drawn through the connection to facilitate a charging operation of the charging system 16. The charging system 16 may be operable to support any number of charging operations having any number of current draw requirements. For the sake of description and without intending to overly limit the scope and contemplation of the present invention, the present invention is predominately described with respect to the charging system attempting to complete a charging operation in a little time as possible, such as by drawing as much current as possible.

The desired current draw may correspond with a maximum operation capability of the wall plug 22, cordset 50, and/or charging system 16. Data may be provided through the wall outlet 20 or otherwise assessed to identify the maximum or desired amount of current. The temperature sensed in Block 82 may also be used to determine the desired amount of current draw, optionally in addition to the other noted parameters. For example, the maximum current draw capabilities of the system 10 may be equal to a first value given the particularly configuration of the system 10 when operating under normal or ideal operating conditions. The desired amount of current determined in Block 84 may be decrease from the first value in proportion to the temperature measured in Block 82 deviating from the normal or ideal operating value or range used to set the maximum current draw. Of course, other limitations identified for the wall outlet 20 or charging system 16, such as those determined based on the data transfer, may be used to further specify the desired current draw.

Block 86 relates to controlling the charging system to begin drawing current at the desired current draw level determined in Block 84. The temperature reading of Block 82 may take place before the current begins to be drawn in Block 86 at the desired rate. The desired current draw may be adjusted in Block 86 to correspond with operational changes, for example, by increasing the desired current draw in the event the charging system desires more current, such as to support additional charging operations.

Block 88 relates to determining a temperature delta based on a temperature measured with the temperature sensor 36. This second temperature reading occurs after the first temperature reading of Block 82. The temperature delta can be equal to a difference between the first and second temperature readings, a rate of temperature change between the first and second temperature readings, a combination thereof, and the like. One of object of determining the temperature delta is to assess how rapid or severely the temperature of the wall outlet 20 is changing as a result of the charging operation, i.e., due to current flow through the connection area. This can be helpful, as described below in more detail, in adjusting current drawn by the charging system 16 to insure the wall outlet 20 is operating within a desired temperature range.

Block 90 relates to determining whether the temperature delta exceeds a threshold value. The threshold value generally corresponds with a desired temperature range of operation for the wall outlet 20, which may vary depending on the type of wall outlet 20, operating conditions/specification, and a need to use the wall outlet 20 (e.g., it may be acceptable to overdrive the outlet 20 in the event of an emergency). As such, the threshold value can be varied depending on any number of considerations. One non-limiting aspect of the present invention contemplates setting the threshold to a value corresponding with an undesirable increase in temperature or an undesirable rate of temperature change, whichever is more likely to reflect a need to either decrease the current being drawn and/or to indicate a need to cease current draw.

Block 92 relates to decreasing the current drawn in the event the temperature delta is exceeded. The current draw may be reduced in proportion to an amount by which the temperature delta exceeded the threshold, according to a stair-stepped technique where incremental changes are made until desired temperature range is achieved, and other methodologies. The temperature delta after reducing the current draw is tested again in Block 90 to determine whether further reductions are needed to insure operation within a desired temperature range. Optionally, the need to increase current draw can also be determined, such as if the current draw was overly decreased, or unnecessarily decreased in light of a transient event, so that the current can be increased in order to maintain the maximum current draw for the desired operating temperature. The threshold value used in each subsequent temperature delta analysis may be varied according to the current operating conditions, the prior temperature reading, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A plug assembly operable for connecting a vehicle cordset used to facilitate powering a vehicle charging system to a wall outlet, the plug assembly comprising:
   a positive connector configured to facilitate carrying current from the wall outlet to the vehicle charging system;
   a neutral connector configured to facilitate returning current from the vehicle charging system to the wall outlet;
   a ground connector configured to facilitate connecting the vehicle charging system to earth ground; and
   a temperature sensor operable to detect a temperature at the wall outlet;
   wherein the vehicle charging system is operable to control current flow through the positive connector as a function of the temperature;
   wherein the current flow is controlled according to a schedule where an amount of current flow is decreased in proportion to an increase in the temperature; and
   wherein the amount of current flow is set by the vehicle charging system to a first level and the schedule specifies:
      decreasing current flow from the first level to a second level in the event the increase in temperature is greater than a first amount and less than a second amount, and
      decreasing current flow from the first level to a third level in the event the increase in temperature is greater than the second amount, the third level being less than the second level.

2. The assembly of claim 1 wherein a resistance of the temperature sensor approximates the temperature at the wall outlet.

3. The assembly of claim 1 wherein the temperature sensor is one of a negative temperature coefficient (NTC) device, a positive temperature coefficient (PTC) device, and a thermistor.

4. The assembly of claim 1 further comprising a housing shaped to enclose the temperature sensor and to support the positive, neutral, and ground connectors such that at least a portion of each of the positive, neutral, and ground connectors extend exterior to the housing to be inserted within corresponding receptacles of the wall outlet.

5. The assembly of claim 4 wherein the housing is injection molded over the temperature sensor, positive connector, neutral connector, and ground connector and comprised of non-conducting, at least semi-rigid material.

6. The assembly of claim 5 further comprising a positive wire, a neutral wire, a ground wire, and a temperature wire respectively connected to the positive connector, the neutral connector, the ground connector, and the temperature sensor, each wire separately extending exterior to the housing within an insulated enclosure for receipt within a receptacle of the vehicle charging system.

7. The assembly of claim 6 wherein a voltage of the temperature wire is measured by the vehicle charging system to determine the temperature.

8. The assembly of claim 1 wherein the schedule specifies ceasing current flow in the event the increase in temperature is greater than a third amount.

9. The assembly of claim 1 wherein a rate at which the amount of current flow is decreased is proportional to a rate at which the temperature increases such that the amount of current flow is decreased more quickly as the rate of temperature increases more quickly.

10. The assembly of claim 1 wherein the plug assembly is further defined as a first plug assembly, and further comprising:
    a vehicle cordset; and
    a second plug assembly to connect to a vehicle.

11. The assembly of claim 10 wherein the second plug assembly is further defined as a multi-port plug assembly.

12. The assembly of claim 11 wherein the multi-port plug assembly further comprises a plug present port.

13. The assembly of claim 11 wherein the multi-port plug assembly further comprises a control pilot port.

14. The assembly of claim 11 wherein the multi-port plug assembly further comprises three hot line ports for three-phase alternating current, one neutral line port, and one earth ground line port.

* * * * *